(12) United States Patent
Han et al.

(10) Patent No.: US 11,184,699 B2
(45) Date of Patent: *Nov. 23, 2021

(54) AUDIO-BASED DEVICE CONTROL

(71) Applicant: QUALCOMM Incorporated, San Diego, CA (US)

(72) Inventors: Feng Han, San Diego, CA (US); Jin Won Lee, San Diego, CA (US); Xinzhou Wu, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/539,116

(22) Filed: Aug. 13, 2019

(65) Prior Publication Data
US 2019/0364371 A1 Nov. 28, 2019

Related U.S. Application Data

(63) Continuation of application No. 15/225,619, filed on Aug. 1, 2016, now Pat. No. 10,477,328.

(51) Int. Cl.
*H04R 1/10* (2006.01)
*H04R 25/00* (2006.01)
(Continued)

(52) U.S. Cl.
CPC ............ *H04R 1/1041* (2013.01); *H04R 1/08* (2013.01); *H04R 3/005* (2013.01); *H04R 25/405* (2013.01);
(Continued)

(58) Field of Classification Search
CPC .... H04R 2499/13; H04R 1/08; H04R 1/1041; H04R 2225/61; H04R 2420/07;
(Continued)

(56) References Cited

U.S. PATENT DOCUMENTS 5,319,747 A   6/1994  Gerrissen et al.
8,175,728 B2  5/2012  Weinberg et al.
(Continued)

FOREIGN PATENT DOCUMENTS

CN  102281484 A  12/2011
CN  102890557 A  1/2013
(Continued)

OTHER PUBLICATIONS

International Search Report and Written Opinion—PCT/US2017/036625—ISA/EPO—Oct. 17, 2017.
(Continued)

*Primary Examiner* — Lun-See Lao
(74) *Attorney, Agent, or Firm* — QUALCOMM Incorporated

(57) ABSTRACT

Some disclosed systems may include a microphone system having two or more microphones, an interface system and a control system. In some examples, the control system may be capable of receiving, via the interface system, audio data from two or more microphones of the microphone system, of determining a gesture location based, at least in part, on the audio data and of controlling one or more settings of the system based on the gesture location.

30 Claims, 8 Drawing Sheets

(51) Int. Cl.
*H04R 3/00* (2006.01)
*H04R 1/08* (2006.01)

(52) U.S. Cl.
CPC ......... *H04R 25/407* (2013.01); *H04R 25/505* (2013.01); *H04R 25/558* (2013.01); *H04R 2225/61* (2013.01); *H04R 2430/20* (2013.01); *H04R 2499/13* (2013.01)

(58) Field of Classification Search
CPC ............ H04R 2430/20; H04R 2460/03; H04R 2499/11; H04R 25/405; H04R 25/407; H04R 25/505; H04R 25/558; H04R 29/004; H04R 29/007; H04R 3/00; H04R 3/005; H04R 3/04; H04R 3/06; H04R 5/00; H04B 2203/547; H04B 3/542; H04B 3/548; H04H 60/00; H04J 3/0647; H04L 12/40; H04L 12/403; H04L 12/4035; H04L 7/0083; H04L 7/04; H04L 12/40039; H04L 12/40058; H04L 12/40156; H04L 12/43; H04N 2005/4432
USPC .............. 381/187, 181, 113; 700/94
See application file for complete search history.

(56) References Cited

U.S. PATENT DOCUMENTS

| | | | |
|---|---|---|---|
| 8,634,565 B2 * | 1/2014 | Asada | H04R 29/00 381/56 |
| 9,024,865 B2 | 5/2015 | Linsky et al. | |
| 9,282,893 B2 | 3/2016 | Longinotti-Buitoni Gianluigi et al. | |
| 9,374,549 B2 | 6/2016 | Cho | |
| 9,866,941 B2 | 1/2018 | Förstner | |
| 10,477,328 B2 * | 11/2019 | Han | H04R 25/405 |
| 2007/0211023 A1 | 9/2007 | Boillot et al. | |
| 2009/0046868 A1 | 2/2009 | Engle et al. | |
| 2013/0022214 A1 * | 1/2013 | Dickins | G06F 3/043 381/74 |
| 2014/0029776 A1 | 1/2014 | Dundas | |
| 2014/0093091 A1 | 4/2014 | Dusan et al. | |
| 2014/0149754 A1 | 5/2014 | Silva et al. | |
| 2014/0362201 A1 | 12/2014 | Nguyen et al. | |
| 2015/0268753 A1 * | 9/2015 | Sheng | H04R 29/00 381/58 |
| 2015/0348377 A1 | 12/2015 | Kauffmann et al. | |
| 2017/0346920 A1 * | 11/2017 | Masaki | H04R 1/1016 |
| 2017/0359467 A1 | 12/2017 | Norris et al. | |
| 2018/0035217 A1 | 2/2018 | Han et al. | |

FOREIGN PATENT DOCUMENTS

| | | |
|---|---|---|
| CN | 104410883 A | 3/2015 |
| CN | 104536576 A | 4/2015 |
| CN | 105260022 A | 1/2016 |
| EP | 2375775 A1 | 10/2011 |
| WO | 2015110587 A1 | 7/2015 |

OTHER PUBLICATIONS

Partial International Search Report—PCT/US2017/036625—ISA/EPO—Sep. 1, 2017.

* cited by examiner

AUDIO-BASED DEVICE CONTROL

CROSS-REFERENCE TO RELATED APPLICATIONS

This application for Patent is a continuation of U.S. application Ser. No. 15/225,619, entitled "AUDIO-BASED DEVICE CONTROL", filed Aug. 1, 2016, the disclosure of which is incorporated by reference herein in its entirety for all purposes.

TECHNICAL FIELD

This disclosure relates to methods and apparatus for device control and more particularly to audio-based device control.

DESCRIPTION OF THE RELATED TECHNOLOGY

There are various types of devices that can be inconvenient for a user to adjust, including but not limited to hearing devices. Such hearing devices may include hearing aids and personal sound amplification products. Many people experience hearing loss that could be mitigated by the use of hearing devices. Unfortunately, both the social stigma associated with the use of hearing devices and the difficulty of adjusting them properly may prevent some people from using them. To alleviate such stigma, there has been a trend of making hearing devices smaller and not easily visible, such as completely-in-canal (CIC) hearing aids. However, the very small area exposed at the opening of the ear canal makes interacting with such devices a challenge. Some existing hearing devices require users to use an external magnet to interact with a built-in magnetometer for on-device control. Improved methods and devices for controlling hearing devices, as well as other devices, would be desirable.

SUMMARY

The systems, methods and devices of this disclosure each have several innovative aspects, no single one of which is solely responsible for the desirable attributes disclosed herein. The methods disclosed herein may be implemented via hardware, firmware, software stored in one or more non-transitory media, and/or combinations thereof.

For example, one or more innovative aspects of the subject matter described in this disclosure can be implemented in a system, which may include one or more devices. In some examples, the system may include a microphone system, an interface system and a control system. In some such examples, the microphone system may include two or more microphones. The microphones of the microphone system may or may not reside in the same device, depending on the particular implementation.

In some implementations, the control system may include at least one processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, and/or combinations thereof.

The interface system may be configured to provide communication (which may include wired or wireless communication, such as electrical communication, radio communication, etc.) between components of the system. In some such examples, the interface system may be configured to provide communication between the control system and the microphone system. According to some examples, the interface system may be configured to provide communication between the system and other devices and/or human beings. In some such examples, the interface system may include a user interface and/or a network interface. In some implementations, the apparatus may include a memory system. The interface system may, in some examples, include at least one interface between the control system and a memory system.

According to some examples, the control system may be capable of receiving, via the interface system, audio data from two or more microphones of the microphone system, and of determining a gesture location based, at least in part, on the audio data. In some such examples, the control system may be capable of controlling one or more settings of the system based on the gesture location. According to some examples, the gesture location may correspond to one of a plurality of predetermined locations of a user's head. Alternatively, or additionally, the gesture location may correspond to one or more other predetermined locations, such as one or more predetermined locations in the interior of an automobile. In some such implementations, the gesture location may correspond to one or more predetermined locations on a steering wheel. In some examples, the gesture location may not be on, or proximate, a component of the system.

According to some examples, the control system may be capable of determining a gesture location based on a time difference between corresponding audio signals detected by the two or more microphones. In some examples, the control system may be capable of determining a gesture location based on based on an amplitude difference between corresponding audio signals detected by the two or more microphones. In some implementations, the control system may be capable of determining a gesture location based on both the time difference and the amplitude difference between corresponding audio signals detected by the two or more microphones.

In some implementations a first device may include a first microphone of the microphone system and a second device may include a second microphone of the microphone system. According to some implementations, the control system may be capable of controlling one or more settings of the first device, the second device, or of both the first device and the second device, based on the gesture location. According to some examples, at least part of the control system may reside in the first device, in the second device or in both the first device and the second device. In some such implementations, at least part of the control system may reside in both the first device and the second device. The first device may be configured for wireless communication and/or wired communication with the second device. The first device and the second device may, for example, be capable of exchanging information regarding the gesture location. According to some implementations, the first device and the second device may be capable of synchronizing adjustments of device settings. In some examples, the first device and the second device may be personal sound amplification products or hearing aids.

In some implementations, a single device may include two or more microphones of the microphone system. In some such implementations, the control system may be capable of determining a gesture location based on audio data from the two or more microphones of the single device.

In some examples, the control system may be capable of determining a gesture type and of controlling one or more settings of the system according to the gesture location and the gesture type. According to some implementations, the gesture type may correspond with one or more gesture patterns. In some examples, the control system may be capable of determining the gesture type according to audio characteristics of a gesture. According to some examples, the control system may be capable of classifying the audio characteristics. According to some such examples, the control system may be capable of classifying the audio characteristics based on audio data received from a single microphone. In some implementations, classifying the audio characteristics may involve determining whether the audio characteristics of a gesture correspond with a tap, a finger snap, a swipe and/or a rubbing gesture.

One or more innovative aspects of the subject matter described in this disclosure can be implemented in a method of controlling one or more devices of a system that includes two or more microphones. The method may involve receiving audio data from the two or more microphones. The method may involve determining a gesture location based, at least in part, on the audio data and controlling one or more settings of the system based on the gesture location.

In some examples, a first device may include a first microphone of the two or more microphones and a second device may include a second microphone of the two or more microphones. The method may involve controlling one or more settings of the first device, the second device, or both the first device and the second device, based on the gesture location. In some implementations, the first device and the second device may be personal sound amplification products or hearing aids.

According to some implementations, the method may involve determining a gesture type. In some such implementations, the method may involve controlling one or more settings of the system according to the gesture location and the gesture type.

Some implementations may include one or more non-transitory media having software stored thereon. In some examples, the non-transitory media may include flash memory, a hard drive and/or other memory devices. In some such implementations, the software may include instructions for controlling at least one apparatus for receiving audio data from two or more microphones, for determining a gesture location based, at least in part, on the audio data, and for controlling one or more settings of a system based on the gesture location.

In some examples, a first device may include a first microphone of the two or more microphones and a second device may include a second microphone of the two or more microphones. In some such examples, the software may include instructions for controlling one or more settings of the first device, the second device, or both the first device and the second device, based on the gesture location.

In some implementations, the software may include instructions for determining a gesture type and controlling one or more settings of the system according to the gesture location and the gesture type. According to some implementations, the software may include instructions for determining the gesture type according to audio characteristics of a gesture.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
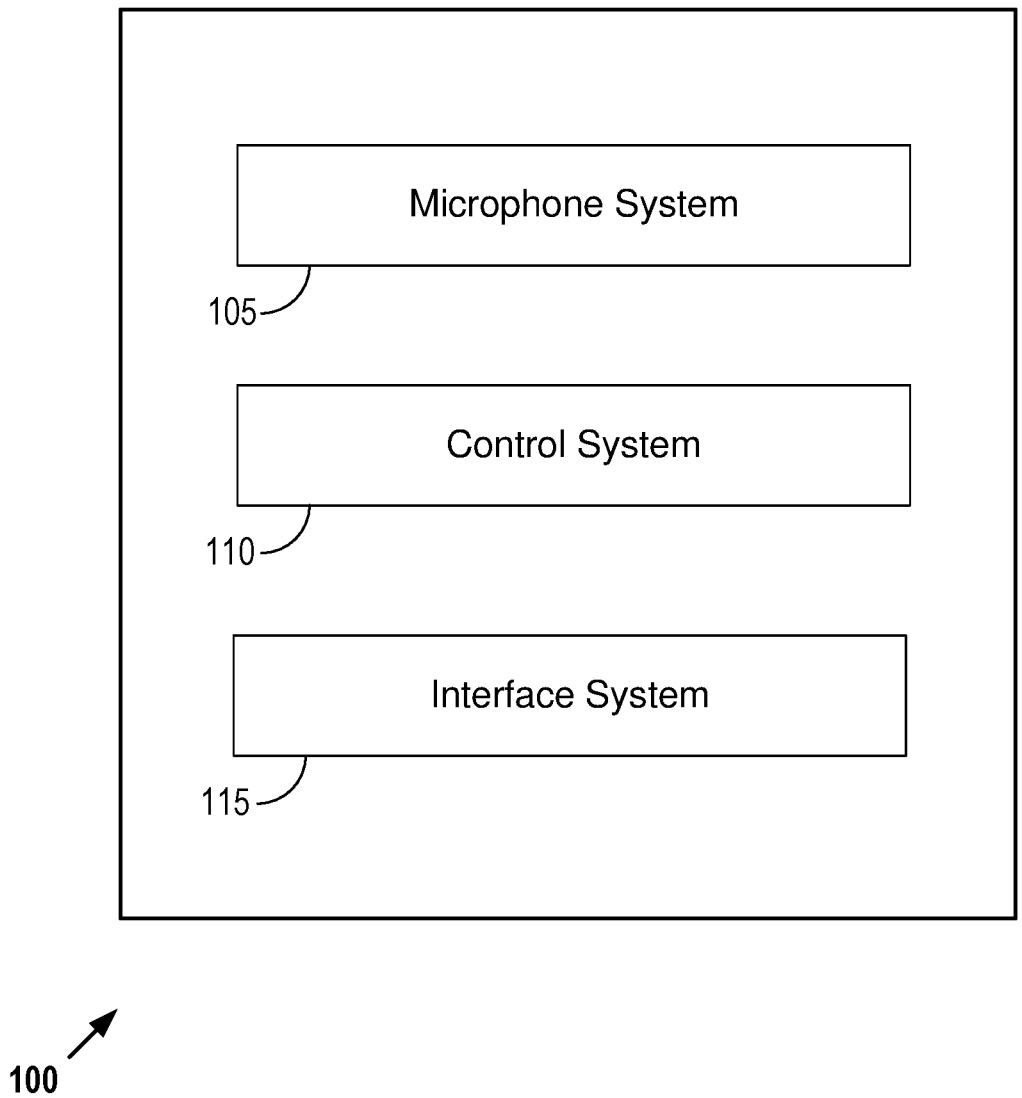
FIG. 1 is a block diagram that shows examples of system elements according to some implementations.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Although there are various types of devices that can be inconvenient for a user to adjust, some hearing devices are particularly challenging in this regard. Therefore, while the teachings of the present disclosure are broadly applicable to many types of devices, various examples are provided herein of in the context of hearing devices, which may include hearing aids and personal sound amplification products. As noted above, for examples, completely-in-canal (CIC) hearing aids can reduce social stigma. However, the very small area exposed at the opening of the ear canal makes interacting with such devices a challenge. Some existing hearing aids require users to use an external magnet to interact with a built-in magnetometer for on-device control, whereas other hearing devices require a user to tap directly on each of the hearing aids in order to adjust their settings. These types of user interactions are tedious, are often unreliable and can create new types of stigma associated with the interactions themselves.

Some disclosed implementations may include a microphone system having two or more microphones, an interface system and a control system. In some examples, the control system may be capable of receiving, via the interface system, audio data from two or more microphones of the microphone system, of determining a gesture location based, at least in part, on the audio data and of controlling one or more settings of an apparatus or a system based on the gesture location. The gesture may, for example, be a tap, a finger snap, a swipe and/or a rubbing gesture. In some examples, the control system may be capable of determining a gesture pattern or a gesture type, e.g., according to audio characteristics of a gesture, and of controlling one or more settings of the apparatus or the system according to the gesture location and the gesture pattern and/or the gesture type. For example, different gesture types, tapping patterns, tapping locations, etc., may correspond with particular adjustments to hearing device settings. Some such implementations provide methods of controlling hearing devices according to taps on predetermined tapping locations of a user's head. Audio data from the microphones of both hearing devices may be used to detect a head tap location and the tapping pattern in a head tap location.

Particular implementations of the subject matter described in this disclosure can be implemented to realize one or more of the following potential advantages. Some hearing device implementations may provide more convenient methods of interacting with inconspicuous hearing devices, such as completely-in-canal (CIC) hearing aids. Some disclosed methods of interacting with hearing devices are more discreet than, e.g., tapping on a hearing aid, and can help to reduce the stigma associated with using such devices. Making such devices more convenient and less embarrassing to use may encourage more people to use hearing devices and mitigate their hearing loss. Mitigating hearing loss, in turn, can reduce social isolation and may enhance a user's personal safety.

However, the teachings of the present disclosure are broadly applicable to many types of devices, including wearable devices such as head-mounted displays (HMDs), smart clothing, smart watches, etc. Some examples of HMD implementations are described below.

Alternative implementations may be deployed in automobiles, e.g., to provide gesture controls to a driver or a passenger. For example, some implementations may be able to determine a location and/or a type of gesture inside an automobile, such as the location of a tap on a steering wheel or a dashboard, a finger snap, a swipe and/or a rubbing gesture. Some such implementations may allow one or more features of an automobile to be controlled by a driver or a passenger according to one or more of such gestures. In some such examples, a driver or a passenger may interact with one or more pressure sensors in order to control one or more features of the automobile.

FIG. 1 is a block diagram that shows examples of system elements according to some implementations. The elements of FIG. 1 are merely provided by way of example. Some implementations may include more or fewer elements. In this example, the system 100 includes a microphone system 105, a control system 110 and an interface system 115.

In some examples, the system 100 may be a single device. However, in alternative implementations the system 100 may include two or more devices. In some such examples, the system 100 may include a first device and a second device. In some examples, the first device and/or the second device may be personal sound amplification products or hearing aids. In some implementations, the system 100 may include one or more wearable devices, such as HMDs. Some such HMDs may be configured for providing an immersive virtual reality experience to a wearer. According to some implementations, at least part of the control system 110 may be in the first device, in the second device or in both the first device and the second device. In some such implementations, at least part of the control system 110 is in both the first device and the second device and the first device is configured for wireless or wired communication with the second device. In some examples, at least part of the control system 110 may be in a mobile device.

In some examples, the microphone system 105 may include two or more microphones. According to some implementations, a first device may include a first microphone of the microphone system and a second device may include a second microphone of the microphone system. However, in some implementations a single device may include two or more microphones of the microphone system. Various examples are disclosed herein.

The interface system 115 may include one or more network interfaces, one or more user interfaces and/or one or more external device interfaces (such as one or more universal serial bus (USB) interfaces). In this example, the interface system 115 includes one or more interfaces between the control system 110 and the microphone system 105. In some examples, the interface system 115 may include one or more interfaces between the control system 110 and a memory system. However, in some implementations the control system 110 may include a memory system.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 110 may be capable of performing, at least in part, the methods disclosed herein.

Figure 2:
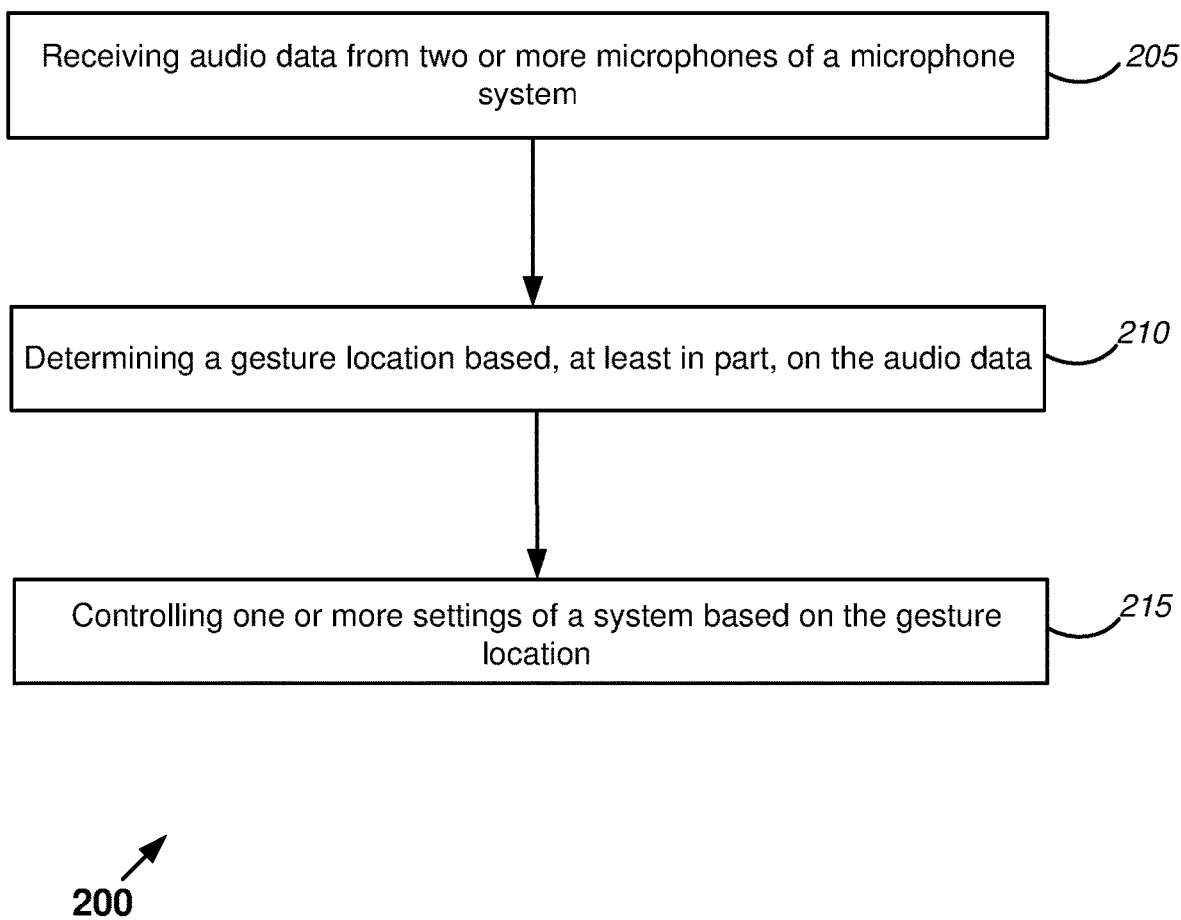
FIG. 2 is a flow diagram that outlines one example of a method that may be performed by a system such as that shown in FIG. 1.

FIG. 2 is a flow diagram that outlines one example of a method that may be performed by a system such as that shown in FIG. 1. Accordingly, the blocks of method 200 are described below with reference to FIG. 1. The blocks of method 200, like other methods described herein, are not necessarily performed in the order indicated. Moreover, such methods may include more or fewer blocks than shown and/or described.

In this example, block 205 involves receiving audio data from two or more microphones of a microphone system. In some implementations, block 205 may involve the control system 110 receiving, via the interface system, audio data from two or more microphones of the microphone system 105.

Here, block 210 involves determining a gesture location based, at least in part, on the audio data. According to some implementations, the control system 110 may be capable of determining a gesture location based, at least in part, on the audio data. In some implementations, the gesture may be a tap, a finger snap, a swipe and/or a rubbing gesture. In some examples, the gesture location may correspond to one of a plurality of predetermined locations of a user's head.

In the example shown in FIG. 2, block 215 involves controlling one or more settings of a system based on the gesture location. In some implementations, the control system 110 may be capable of controlling one or more settings of the system 100 based on the gesture location. As noted above, in some implementations, a first device may include a first microphone of the microphone system and a second device may include a second microphone of the microphone system. According to some such implementations, the control system may be capable of controlling one or more settings of the first device, the second device, or of both the first device and the second device, based at least in part on the gesture location.

In some such examples, at least part of the control system may reside in the first device, in the second device or in both the first device and the second device. According to some such examples, at least part of the control system resides in both the first device and the second device. The first device may be configured for wireless or wired communication with the second device. In some examples, the first device and the second device may be capable of exchanging information regarding gesture location determination. According to some such examples, the first device and the second device may be capable of synchronizing adjustments of device settings.

However, in some implementations a single device may include two or more microphones of the microphone system. The control system may be capable of determining a gesture location based on audio data from the two or more microphones of the single device.

Figure 3A:
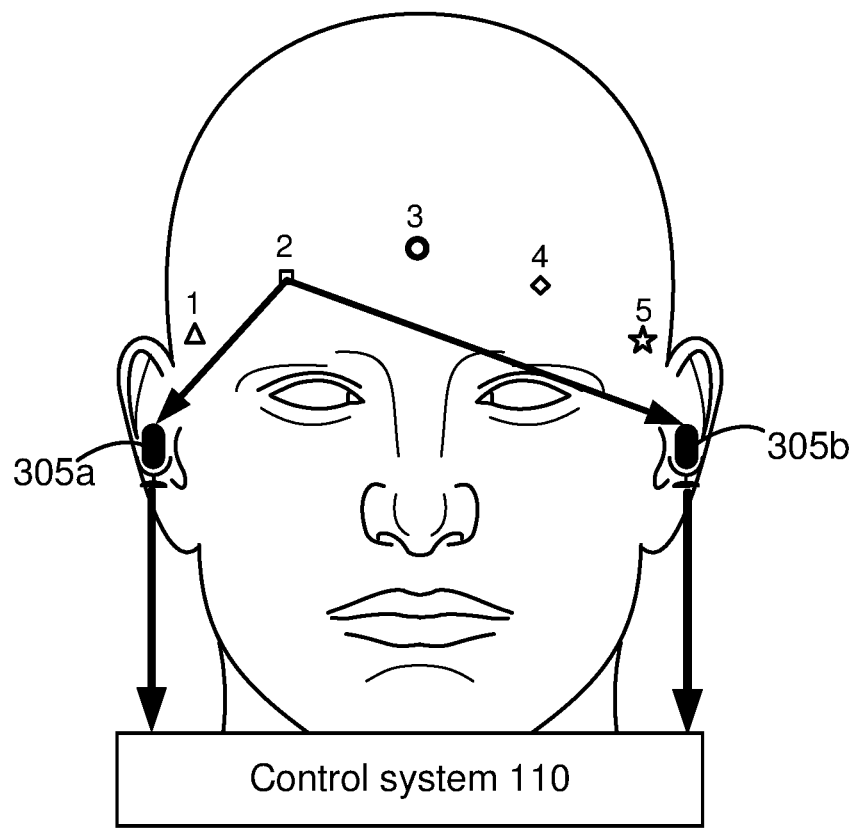
FIG. 3A shows examples of predetermined gesture locations on a person's head.

FIG. 3A shows examples of predetermined gesture locations on a person's head. In this example, there are five predetermined gesture locations, labeled 1 through 5 in FIG. 3A. However, other implementations may involve more or fewer gesture locations. Moreover, other implementations may involve more or gesture locations in locations other than a person's head. Various examples are disclosed herein.

In this example, the microphones 305a and 305b are shown receiving sound waves from a gesture at gesture location 2. The microphones 305a and 305b may be microphones of a microphone system 105 disclosed herein. In some implementations, the gesture may include one or more taps, slaps, swipes, rubs, finger snaps, etc. In this example, none of the gesture locations correspond with a component of the microphone system 105 or the control system 110. In this example, the control system 110 is configured for communication with the microphones 305a and 305b, e.g., via an interface system 115 disclosed herein, and is configured to receive audio data from the microphones 305a and 305b corresponding with the gesture. The control system 110 may be configured for communication with the microphones 305a and 305b via a wired or a wireless interface, depending on the particular implementation.

In some examples, the microphone 305a may reside in a first device and the microphone 305b may reside in a second device. In some such examples, the first device and the second device may be personal sound amplification products or hearing aids. According to some alternative examples, a single device may include the microphone 305a and the microphone 305b. Some examples are described below.

In this implementation, the control system 110 resides, at least in part, in a device that is separate from the microphones 305a and 305b. In some such implementations, the control system 110 may reside, at least in part, in a smart phone, in a watch and/or in another type of device, such as another type of wearable device. However, in some implementations, the control system 110 may reside, at least in part, in a device that includes the microphone 305a, the microphone 305b, or both the microphones 305a and 305b.

In this example, the control system 110 is capable of determining a gesture location based, at least in part, on the audio data received from the microphones 305a and 305b. In some such examples, the control system 110 may be capable of determining a gesture location based on a time difference between corresponding audio signals detected by the microphones 305a and 305b. Alternatively, or additionally, the control system 110 may be capable of determining a gesture location based on an amplitude difference between corresponding audio signals detected by the microphones 305a and 305b.

Figure 3B:
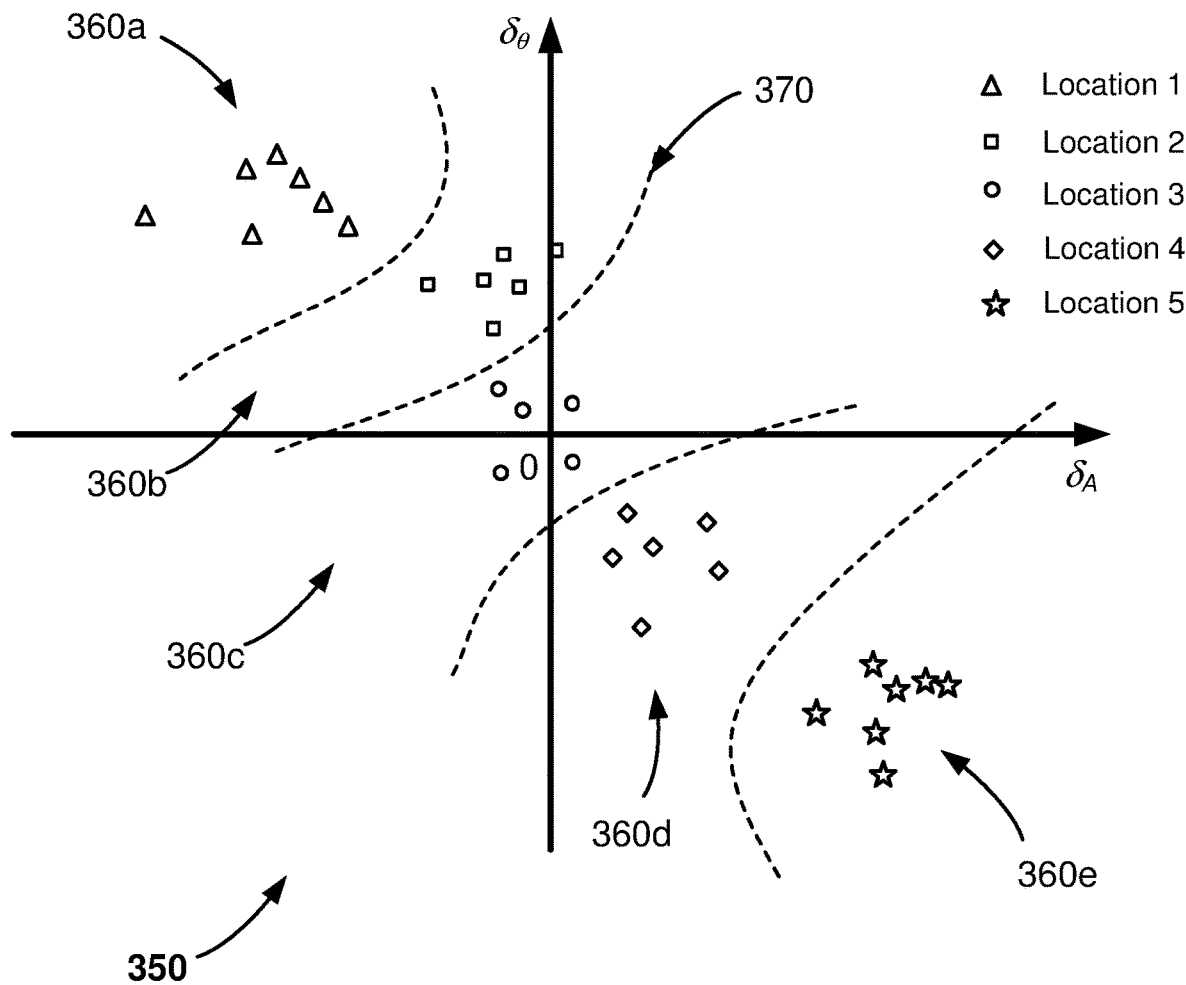
FIG. 3B is a graph of amplitudes and phase differences that correspond with gestures at the predetermined locations shown in FIG. 3A.

FIG. 3B is a graph of amplitudes and phase differences that correspond with gestures at the predetermined locations shown in FIG. 3A. In graph 350, the horizontal axis indicates amplitude differences $\delta_A$ between corresponding audio signals detected by the microphones 305a and 305b and the vertical axis indicates phase differences $\delta_\theta$ between corresponding audio signals detected by the microphones 305a and 305b. The phase differences $\delta_\theta$ correspond to arrival time differences between corresponding audio signals detected by the microphones 305a and 305b. The symbol shapes for gesture locations 1-5 correspond with those shown in FIG. 3A. In this example, each of the symbol instances indicated on the graph 350 correspond to the sounds of individual taps, at the corresponding gesture locations, that were detected by the microphones 305a and 305b. It may be seen in the graph 350 that the symbol instances for each of the gesture locations are clustered in areas 360a-360e, which are separated by the dashed lines 370.

Accordingly, in this example the control system 110 may determine a gesture location according to which of the areas 360a-360e an audio signal corresponding to the gesture is mapped. For instance, if an audio signal corresponding to the gesture has an amplitude difference $\delta_A$ and a phase difference $\delta_\theta$, the audio signal will be mapped to the area 360c and the control system 110 will determine that the gesture was made at gesture location 3.

However in alternative examples, the control system 110 may determine a gesture location according to only an amplitude difference, or only according to a phase or time difference. It may be observed from the graph 350 that a gesture at any one of locations 1, 3 and 5 could readily be determined according to only an amplitude difference, or only according to a phase or time difference.

In some examples, the control system 110 may be capable of controlling one or more settings of a system based, at least in part, on the gesture location. For example, the control system 110 may be capable of adjusting one or more settings of a device that includes the microphone 305a and/or the microphone 305b based, at least in part, on the gesture location.

According to some such examples, the control system 110 may be capable of adjusting one or more settings of a hearing device, such as a personal sound amplification product or a hearing aid, based at least in part on the gesture location. For example, a gesture location may correspond with a setting type (such as a volume setting) and/or to a hearing device for which a setting will be adjusted. In one such example, a first gesture in location 1 may indicate a change in the setting for a hearing device of the user's right ear, whereas a first gesture in location 5 may indicate a change in the setting for a hearing device of the user's left ear. One or more subsequent gestures may indicate a type of setting to be changed and how to change the setting.

In some implementations, the control system 110 may be capable of adjusting one or more settings of a wearable device, such as an HMD for providing a virtual reality experience, based at least in part on the gesture location. For example, a gesture location may correspond with a setting type, such as a display setting type or an audio setting type. In one such example, a first gesture in location 1 may indicate a change in a setting for a speaker of the HMD that is positioned near the user's right ear, whereas a first gesture in location 5 may indicate a change in the setting for a speaker of the HMD that is positioned near the user's left ear. A first gesture in location 3 may indicate a change in a display setting for the HMD. One or more subsequent gestures may indicate a type of setting to be changed and how to change the setting.

According to some automobile-based implementations, a first gesture in a predetermined location of an automobile (e.g., on the dashboard, on the steering wheel, on a seat or arm rest, etc.) may indicate a change in a particular automobile setting, such as an audio setting, a display setting, a cruise control setting, an autopilot setting, etc. One or more subsequent gestures may indicate how to change the setting.

In some examples, the control system 110 may be capable of determining a gesture type and of controlling one or more settings of the system according to the gesture location, the gesture type, or both the gesture location and the gesture type. According to some implementations, the gesture type may be a tap, a finger snap, a swipe or a rubbing gesture (such as the sound of a thumb and another digit rubbing together, the sound of a finger rubbing on a face, etc.). In some examples, the gesture type may correspond with one or more gesture patterns, such as tapping patters, finger snap patterns, swiping patterns, etc.

Figure 4:
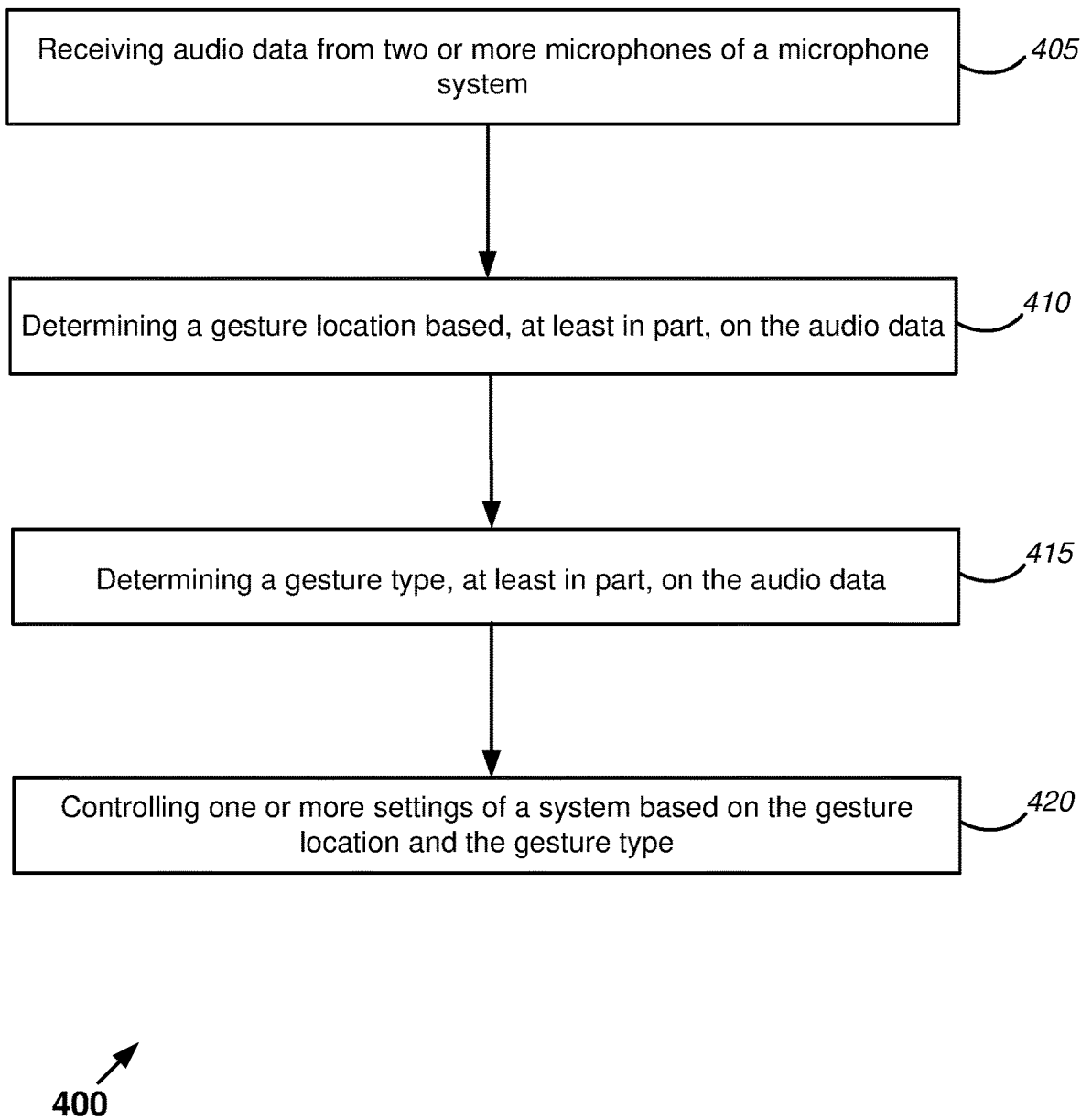
FIG. 4 is a flow diagram that outlines one example of a method that may be performed by a system such as that shown in FIG. 1.

FIG. 4 is a flow diagram that outlines one example of a method that may be performed by a system such as that shown in FIG. 1. Accordingly, the blocks of method 400 are described below with reference to FIG. 1. The blocks of method 400, like other methods described herein, are not necessarily performed in the order indicated. Moreover, such methods may include more or fewer blocks than shown and/or described.

In this example, block 405 involves receiving audio data from two or more microphones of a microphone system. In some implementations, block 405 may involve the control system 110 receiving, via the interface system, audio data from two or more microphones of the microphone system 105. Here, block 410 involves determining a gesture location based, at least in part, on the audio data. According to some implementations, the control system 110 may determine a gesture location in block 410. In some implementations, the gesture may be a tap, a finger snap, a swipe and/or a rubbing gesture. In some examples, the gesture location may correspond to one of a plurality of predetermined locations of a user's head. In other examples, the gesture location may correspond to one of a plurality of predetermined locations of an automobile.

In this implementation, block 415 involves determining a gesture type based, at least in part, on the audio data. According to some such examples, in block 415 the control system 110 may determine a gesture type according to audio characteristics of a gesture. The audio characteristics may include one or more amplitude characteristics, frequency characteristics, phase characteristics, rhythm characteristics, etc. For example, the sound of a tap in a fleshy part of a user's body may have a relatively lower amplitude and may include lower-frequency sounds than a finger snap. The sound of a swipe or a rubbing gesture will typically have a relatively longer time duration than a snap or a tap. Because some audio characteristics may be more evident in the time domain and other audio characteristics may be more evident in the frequency domain, some implementations may involve transforming audio data from the time domain into the frequency domain. In some examples, the control system 110 may be capable of classifying the audio characteristics of a gesture and of determining a gesture type based on audio data received from a single microphone.

Here, block 420 involves controlling one or more settings of a system based on the gesture location and the gesture type. In some such examples, in block 420 the control system 110 may adjust one or more settings of a hearing device, such as a personal sound amplification product or a hearing aid, based on the gesture location and the gesture type. For example, a predetermined gesture location may correspond with a setting type and a gesture pattern may correspond with a particular setting adjustment. For instance, one predetermined gesture location may correspond with a volume setting. A single tap (or other gesture) in the predetermined gesture location may indicate that the volume setting of both hearing devices should be incremented, whereas a double tap in the same predetermined gesture location may indicate that the volume setting of both hearing devices should be decremented. Other predetermined gesture locations may correspond with other hearing device settings, such as beam-steering to allow the user to hear sound more clearly from a particular direction. One or more gestures in a predetermined gesture location may allow a user to select a sound direction of interest.

Figure 5A:
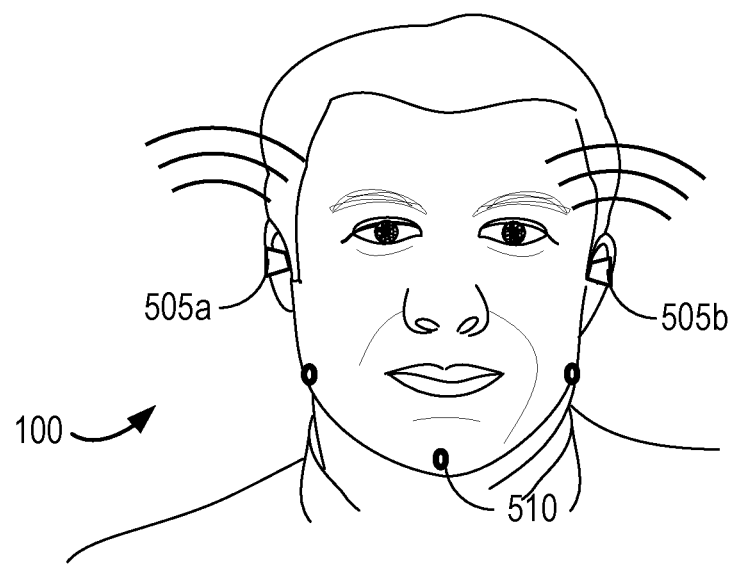
FIG. 5A shows an alternative implementation.

FIG. 5A shows an alternative implementation. In this example, the system 100 includes the hearing devices 505a and 505b, which are capable of wireless communication with one another. Accordingly, this is an example of the interface system 115 including a wireless interface. In this implementation, a portion of the control system 110 resides in the hearing device 505a and another portion of the control system 110 resides in the hearing device 505b. According to this example, the hearing devices 505a and 505b each include one or more microphones and one or more speakers.

In this example, three gesture locations 510 are shown in predetermined locations of a user's head. In this example, the gesture locations 510 are in predetermined locations of the user's jaw. In this implementation, the control system 110 is capable of determining a gesture location based, at least in part, on audio data from microphones of the hearing devices 505a and 505b. Here, the control system 110 is capable of controlling one or more settings of the hearing devices 505a and 505b based, at least in part, on the gesture location.

In some examples, the control system 110 may capable of determining a gesture type and of controlling one or more settings of the hearing devices 505a and 505b based, at least in part, on the gesture type. According to some implementations, the hearing devices 505a and 505b may be capable of exchanging information regarding the gesture location and/or the gesture type. In some examples, the hearing devices 505a and 505b may be capable of synchronizing adjustments of device settings, such as volume settings, directionality settings, and/or other settings.

Figure 5B:
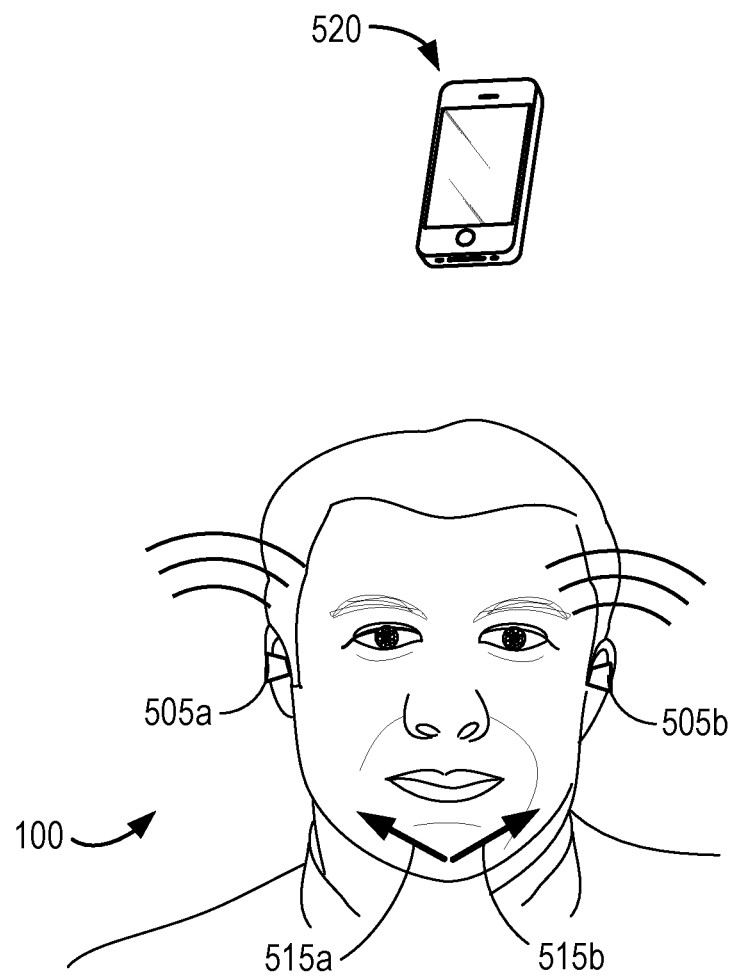
FIG. 5B shows another alternative implementation.

FIG. 5B shows another alternative implementation. In this example, the system 100 includes the hearing devices 505a and 505b, as well as the mobile device 520, all of which are capable of wireless communication with one another. Therefore, this is another example of the interface system 115 including a wireless interface. In this implementation, a portion of the control system 110 resides in the hearing device 505a, a portion of the control system 110 resides in the hearing device 505b and another portion of the control system 110 resides in the mobile device 520. As in the example described with reference to FIG. 5A, the hearing devices 505a and 505b each include one or more microphones and one or more speakers.

According to some implementations, the control system 110 may capable of determining a gesture location and/or a gesture type and of controlling one or more settings of the hearing devices 505a and 505b based, at least in part, on the gesture location and/or the gesture type. In the example shown in FIG. 5B, the gestures 515a and 515b correspond to swipes on opposing sides of the user's chin, which may be hand swipes or finger swipes. In this example, the control system 110 is capable of determining a gesture location and a gesture type according to sounds caused by the gestures 515a and 515b, which are detected by microphones in the hearing devices 505a and 505b. According to some such implementations, the portion of the control system 110 that resides in the mobile device may capable of determining a gesture location and/or a gesture type and of controlling one or more settings of the hearing devices 505a and 505b based, at least in part, on the gesture location and/or the gesture type.

Figure 6:
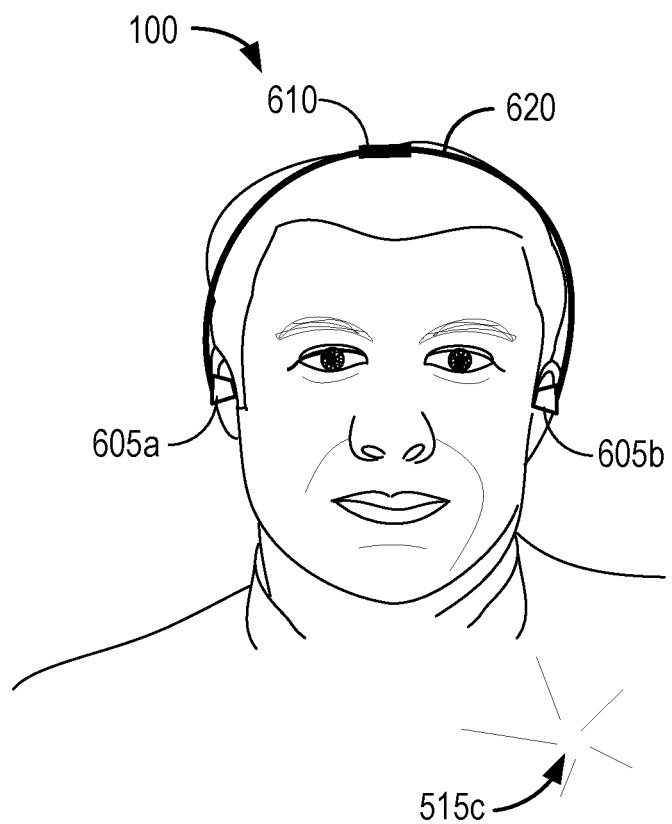
FIG. 6 shows still another alternative implementation.

FIG. 6 shows still another alternative implementation. In this example, the system 100 includes the devices 605a and 605b and a control system 610, all of which are configured for communication with one another via wires in the headset 620. In this example, the devices 605a and 605b each include one or more microphones and one or more speakers. However, the devices 605a and 605b may or may not be hearing devices, depending on the particular implementation.

In this example, the control system 610 is an instance of the control system 110 that is shown in FIG. 1. According to some implementations, the control system 610 is capable of determining a gesture location and/or a gesture type and of controlling one or more settings of the devices 605a and 605b based, at least in part, on the gesture location and/or the gesture type. Such examples include an implementation in which a single device includes two or more microphones of a microphone system and wherein the control system is capable of determining a gesture location based on audio data from the two or more microphones of the single device.

In the example shown in FIG. 6, the gesture 515c is a finger snap. In this example, the control system 610 is capable of determining a gesture location and a gesture type according to sounds caused by the gesture 515c, which are detected by microphones in the devices 605a and 605b. For example, a finger snap may be detected according to its amplitude, frequency content and/or short duration. According to some alternative implementations, a portion of the control system 610 may reside in the device 605a, in the device 605b or in another device, such as a mobile device.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. A mobile device comprising:
a wireless interface; and
one or more processors configured to:
receive, via the wireless interface system, first audio data from a first microphone of a first device and second audio data from a second microphone of a second device, wherein the first audio data and the second audio data indicate a gesture, wherein the first and second audio data originate from the gesture;
determine a location of the gesture relative to the first microphone and the second microphone based, at least in part, on the first audio data and the second audio data, wherein the location is not on the first device, the second device or the mobile device; and
control one or more settings of the mobile device based on the gesture location.

2. The mobile device of claim 1, the one or more processors is further configured to control one or more settings of the first device, the second device or both based on the gesture location.

3. The mobile device of claim 1, wherein the location may comprise a location on the user's head, a location on the user's jaw, a location in an interior of an automobile, a location not proximate to the first device or second device, or any combination thereof.

4. The mobile device of claim 1, wherein the one or more processors are further configured to determine a type of the gesture; and
wherein the one or more processors configured to control one or more settings of the mobile device is further based on the gesture location and the gesture type.

5. The mobile device of claim 4, wherein the gesture type corresponds with one or more gesture patterns.

6. The mobile device of claim 4, wherein the one or more processors configured to determine a type of the gesture is based on the audio characteristics of the gesture.

7. The mobile device of claim 6, wherein the gesture type comprises a tap, a finger snap, a swipe or a rubbing gesture.

8. The mobile device of claim 1, wherein the one or more processors configured to determine the gesture location based, at least in part, on the first audio data and the second audio data comprises the one or more processors configured to determine the gesture location based on a time difference between the first and second audio signals, an amplitude difference between the first and second audio signals, or both.

9. A method of controlling one or more devices, the method comprising:
receiving, via the wireless interface system of a mobile device, first audio data from a first microphone of a first device and second audio data from a second microphone of a second device, wherein the first audio data and the second audio data indicate a gesture, wherein the first and second audio data originate from the gesture;
determining a location of the gesture relative to the first microphone and the second microphone based, at least in part, on the first audio data and the second audio data, wherein the location is not on the first device, the second device or the mobile device; and
controlling one or more settings of the mobile device based on the gesture location.

10. The method of claim 9, further comprising controlling one or more settings of the first device, the second device or both based on the gesture location.

11. The method of claim 9, wherein the location may comprise a location on the user's head, a location on the user's jaw, a location in an interior of an automobile, a location not proximate to the first device or second device, or any combination thereof.

12. The method of claim 9, further comprising:
determining a type of the gesture; and wherein controlling the one or more settings of the mobile device is further based on the gesture type.

13. The method of claim 12, wherein the gesture type corresponds with one or more gesture patterns.

14. The method of claim 12, wherein the one or more processors configured to determine a type of the gesture is based on the audio characteristics of the gesture.

15. The method of claim 14, wherein the gesture type comprises a tap, a finger snap, a swipe or a rubbing gesture.

16. The method of claim 9, wherein the determining the gesture location based, at least in part, on the first audio data and the second audio data comprises determining the gesture location based on a time difference between the first and second audio signals, an amplitude difference between the first and second audio signals, or both.

17. A mobile device comprising:
   means for receiving first audio data from a first microphone of a first device and second audio data from a second microphone of a second device, wherein the first audio data and the second audio data indicate a gesture, wherein the first and second audio data originate from the gesture;
   means for determining a location of the gesture relative to the first microphone and the second microphone based, at least in part, on the first audio data and the second audio data, wherein the location is not on the first device, the second device or the mobile device; and
   means for controlling one or more settings of the mobile device based on the gesture location.

18. The mobile device of claim 17, the mobile device further comprising means for controlling one or more settings of the first device, the second device or both based on the gesture location.

19. The mobile device of claim 17, wherein the location may comprise a location on the user's head, a location on the user's jaw, a location in an interior of an automobile, a location not proximate to the first device or second device, or any combination thereof.

20. The mobile device of claim 17, wherein the mobile device further comprises means for determining a type of the gesture; and
   wherein the means for controlling one or more settings of the mobile device is further based on the gesture location and the gesture type.

21. The mobile device of claim 20, wherein the gesture type corresponds with one or more gesture patterns.

22. The mobile device of claim 20, wherein the means for determining a type of the gesture is based on the audio characteristics of the gesture.

23. The mobile device of claim 22, wherein the gesture type comprises a tap, a finger snap, a swipe or a rubbing gesture.

24. The mobile device of claim 17, wherein the means for determining the gesture location based, at least in part, on the first audio data and the second audio data comprises means for determining the gesture location based on a time difference between the first and second audio signals, an amplitude difference between the first and second audio signals, or both.

25. A non-transitory computer-readable medium for controlling one or more devices comprising processor-executable program code configured to cause one or more processors to:
   receive, via the wireless interface system of a mobile device, first audio data from a first microphone of a first device and second audio data from a second microphone of a second device, wherein the first audio data and the second audio data indicate a gesture wherein the first and second audio data originate from the gesture;
   determine a location of the gesture relative to the first microphone and the second microphone based, at least in part, on the first audio data and the second audio data, wherein the location is not on the first device, the second device or the mobile device; and
   control one or more settings of the mobile device based on the gesture location.

26. The non-transitory computer-readable medium of claim 25, further comprising program code configured to cause one or more processors to control one or more settings of the first device, the second device or both based on the gesture location.

27. The non-transitory computer-readable medium of claim 25, wherein the location may comprise a location on the user's head, a location on the user's jaw, a location in an interior of an automobile, a location not proximate to the first device or second device, or any combination thereof.

28. The non-transitory computer-readable medium of claim 25, further comprising program code configured to cause one or more processors to:
   determine a type of the gesture; and
   wherein the program code configured to cause one or more processors to control the one or more settings of the mobile device is further based on the gesture type.

29. The non-transitory computer-readable medium of claim 28, wherein the gesture type corresponds with one or more gesture patterns.

30. The non-transitory computer-readable medium of claim 28, wherein the program code configured to cause one or more processors to determine a type of the gesture is based on the audio characteristics of the gesture.

\* \* \* \* \*